United States Patent [19]

Marasco

[11] Patent Number: 5,953,744
[45] Date of Patent: Sep. 14, 1999

[54] REPLICATION OF CONTENTS OF HARD DISK TO HARD DISK OF GREATER STORAGE CAPACITY THROUGH ADJUSTMENT OF ADDRESS FIELDS IN SECTORS

[75] Inventor: Bernie R. Marasco, Superior, Colo.

[73] Assignee: Exabyte Corporation, Boulder, Colo.

[21] Appl. No.: 08/735,440

[22] Filed: Jan. 2, 1997

[51] Int. Cl.[6] ............................. G06F 13/00; G11B 7/00
[52] U.S. Cl. .................... 711/162; 711/161; 711/162; 711/167; 711/170; 711/103; 711/200; 369/84; 360/48
[58] Field of Search .................. 711/162, 165, 711/167, 173, 170, 103, 200, 206, 162.4, 161, 113; 395/200.52, 182.04; 360/72.1; 707/205; 369/84; 709/222

[56] References Cited

U.S. PATENT DOCUMENTS

| | | | |
|---|---|---|---|
| 4,494,156 | 1/1985 | Kadison et al. | 360/48 |
| 4,823,333 | 4/1989 | Satoh et al. | 369/84 |
| 5,038,319 | 8/1991 | Carter et al. | 395/181 |
| 5,113,512 | 5/1992 | Miki et al. | 711/206 |
| 5,321,826 | 6/1994 | Ushiro | 711/162 |
| 5,438,671 | 8/1995 | Miles | 711/4 |
| 5,469,573 | 11/1995 | McGill, III et al. | 395/712 |
| 5,610,893 | 3/1997 | Soga et al. | 369/84 |
| 5,664,186 | 9/1997 | Bennett et al. | 711/162 |
| 5,675,769 | 10/1997 | Ruff et al. | 711/173 |
| 5,721,952 | 2/1998 | Lin et al. | 395/839 |

OTHER PUBLICATIONS

Central Point Software., Central Point Backup, Hard Disk Backup fro Windows and DOS., Version 7, 1991.
Central Point Software, Central Backup, Hard Disk Backup for Windows and DOS, Version 7, 1991.

*Primary Examiner*—Frank J. Asta
*Assistant Examiner*—William C. Vaughn, Jr.
*Attorney, Agent, or Firm*—Nixon & Vanderhye, P.C.

[57] ABSTRACT

Method, apparatus and program are provided for replicating an image of a source hard disk (22) onto a larger destination hard disk (22') in a manner that renders available the non-image-utilized sectors of the destination hard disk. Destination disk address dimensions are obtained from a drive (24') which handles the destination hard disk. Both source disk address dimensions and an image of sectors stored on the source disk are obtained from a temporary storage media (84). The image of the source disk is recorded on the destination disk (22'), but address values stored in the sectors of the image are adjusted to be based on the destination disk address dimensions rather than the source disk address dimensions.

22 Claims, 12 Drawing Sheets

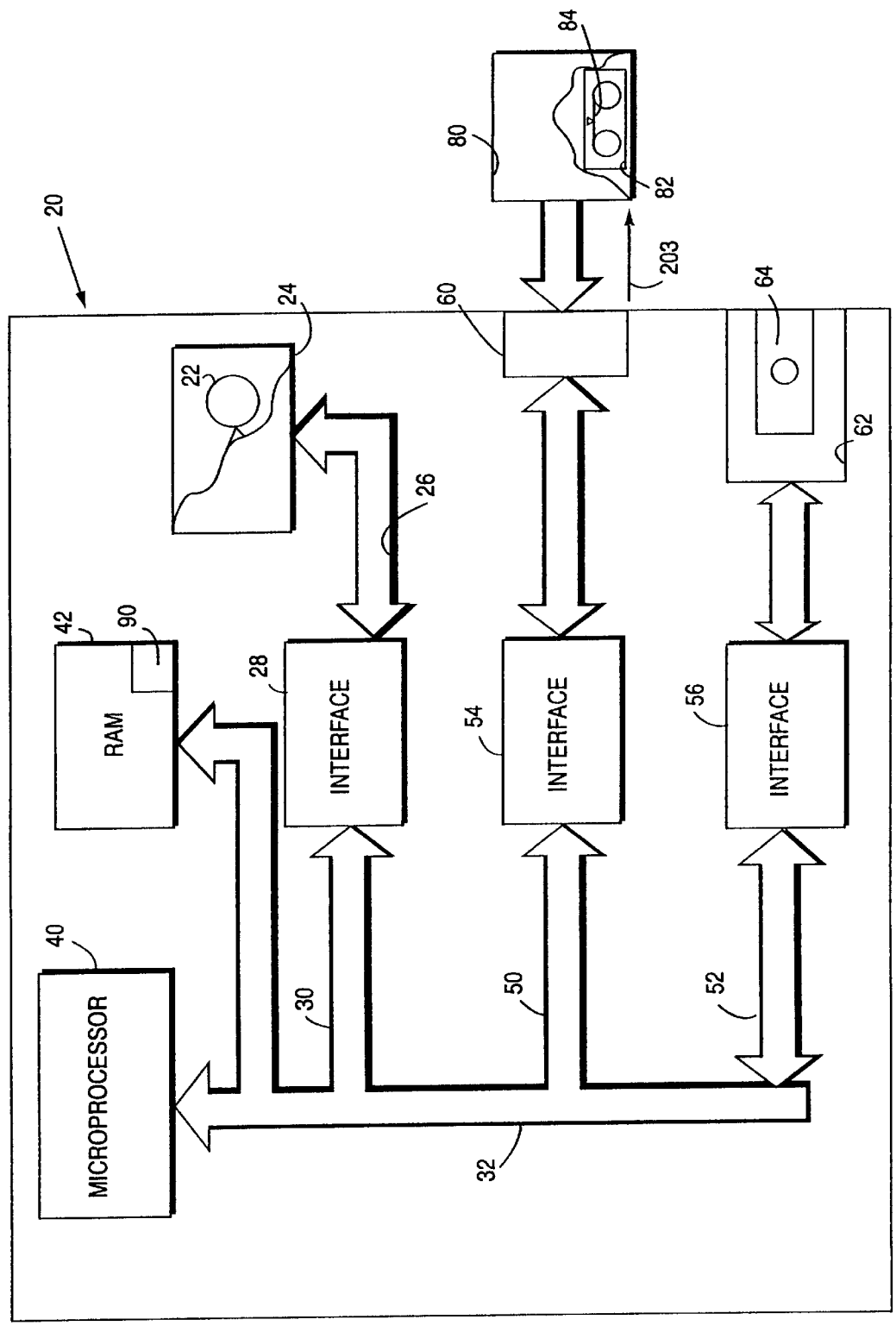

| Structure of the partition sector of a hard drive | | |
|---|---|---|
| Addr. | Contents | Type |
| +000h | Partition code | Code |
| +1Beh | 1. Entry in the partition table | 16 BYTE |
| +1CEh | 2. Entry in the partition table | 16 BYTE |
| +1DEh | 3. Entry in the partition table | 16 BYTE |
| +1EEh | 4. Entry in the partition table | 16 BYTE |
| +1FEh | ID code (AA55h), which identifies the partition sector as such | 2 BYTE |
| Length: 200h (512 Bytes) | | |

Fig. 9

| Structure of an entry in the partition table | | |
|---|---|---|
| Addr. | Contents | Type |
| +00h | Partition status<br>00h = inactive<br>80h = Boot-Partition | BYTE |
| +01h | Read/write head, with which the partition begins | 1 BYTE |
| +02h | sector and cylinder, with which the partition begins | 1 WORD |
| +04h | Partition type<br>00h = Entry not allocated<br>01h = DOS with 12-Bit-FAT (primary Part.)<br>02h = XENIX<br>03h = XENIX<br>04h = DOS with 16-Bit-FAT (primary Part.)<br>05h = extended DOS - Partition (DOS 3.3)<br>06h = DOS-4.0 partition with more<br>       than 32 Megs<br>08h = Concurrent DOS<br>Other codes possible in combination with other operating systems or special driver software. | 1 BYTE |
| +05h | Read/write head, with which the partition ends | 1 BYTE |
| +06h | sector and cylinder, with which the partition ends | 1 WORD |
| +08h | Removal of first sector of the partition (Boot-sector) of partition sector in sectors | 1 DWORD |
| +0Ch | Number of sectors in this partition | 1 DWORD |
| Length: 10h (16 Bytes) | | |

Fig. 10

| Boot sector layout | | |
|---|---|---|
| Address | Contents | Type |
| 00H | Jump to boot routine (E9xxx or EBxx90) | 3 bytes |
| 03H | Manufacturer's name and version number | 8 bytes |
| 0BH | Bytes per sector | 1 word |
| 0DH | Sectors per cluster | 1 byte |
| 0EH | Number of reserved sectors | 1 word |
| 10H | Number of FATs | 1 byte |
| 11H | Number of entries in root directory | 1 word |
| 13H | Number of sectors in volume | 1 word |
| 15H | Media descriptor | 1 byte |
| 16H | Number of sectors per FAT | 1 word |
| 18H | Sectors per track | 1 word |
| 1AH | Number of read/write heads | 1 word |
| 1CH | Number of hidden sectors | 1 word |
| 1EH-1FFH | BOOT ROUTINE | |

Fig. 15

| CYLINDER WITH WHICH THE PARTITION BEGINS | 2 BYTES |
|---|---|
| HEAD WITH WHICH THE PARTITION BEGINS | 2 BYTES |
| SECTOR WITH WHICH THE PARTITION BEGINS | 1 WORD |
| PRINTER TO BUFFER LOCATION WHERE ADJUSTED SECTOR IS STORED | 4 BYTES |

1500A encompasses the first three rows; 1500B encompasses the fourth row. Together they form 1500(1).

⋮

| CYLINDER WITH WHICH THE PARTITION BEGINS | 2 BYTES |
|---|---|
| HEAD WITH WHICH THE PARTITION BEGINS | 1 BYTE |
| SECTOR WITH WHICH THE PARTITION BEGINS | 1 WORD |
| POINTER TO BUFFER LOCATION WHERE ADJUSTED SECTOR IS STORED | 4 BYTES |

1500(26)

REPLICATION OF CONTENTS OF HARD DISK TO HARD DISK OF GREATER STORAGE CAPACITY THROUGH ADJUSTMENT OF ADDRESS FIELDS IN SECTORS

This application is related to simultaneously filed U.S. patent application Ser. No. 08/774,733, entitled "NON-INTRUSIVE REPLICATION OF HARD DISK", which is incorporated herein by reference.

BACKGROUND

1. Field of Invention

This invention pertains to information storage, and particularly to replicating the stored contents of a hard disk drive on a hard disk drive of greater storage capacity.

2. Related Art and Other Considerations

Computers have processors, such as a microprocessor, which execute coded instructions to perform various operations. Some of the coded instructions are operating system programs which are necessary to operate the computer generally. Others of the coded instructions may be application programs which are executed in the context of the operating system programs to perform specific tasks, typically interactively, for the user, e.g., word processing programs, telecommunication programs, financial programs, etc.

In conjunction with its operation, the processor of the computer requires a memory for various purposes. For example, a computer requires memory for storing the operating system programs, for storing the application programs, and for storing data (typically in the form of files) generated by the user in the course of execution of the application programs. Some of the memory is in the form of a semi-conductor chip such as a random access memory (RAM). Although instructions and/or data in chip type memory are advantageously readily accessible to the processor, such memory is generally quite expensive and of limited capacity.

Therefore, most of the memory utilized by a computer is in the form of non-semiconductor memory. Non-semiconductor memory is typically slower but less expensive than chip type memory. Perhaps the most prominent type of non-semiconductor memory is a disk which usually resides in the same enclosure or housing with the circuit board(s) upon which reside e.g., the chip type memory and the processor. The disk is commonly termed a "hard disk", and traditionally is a magnetic disk (although recently optical disks are becoming common). Recording of information on the disk and retrieval of information from the disk is performed by a unit known as the disk drive. The microprocessor usually works through a special electrical circuit or chip known as a drive interface for communicating with the drive.

Other types of non-semiconductor memory are typically accessed by a computer as well, such as floppy disks and magnetic tape. In the case of magnetic tape, recording and reproducing operations are performed by a tape drive. The tape drive is typically connected to the microprocessor through a special interface or port. Tape drives have been utilized for storing information of various types, including storing a back-up copy of some or all of the contents of a computer's hard disk. While historically tape drives have been external to the computer enclosure or housing, more recently internal tape drives have been introduced, such as the Eagle™ family of tape drives manufactured by Exabyte Corporation.

From time to time it may be desired or necessary to copy the contents of a computer's existing hard disk onto another hard disk (e.g., a new hard disk). Such can occur, for example, in the case of a defect or problem with the existing hard disk which necessitates replacement with a new hard disk. In other cases, the computer user may desire to upgrade the computer to have an enhanced hard disk (e.g., a hard disk of greater capacity or access speed). In yet other cases, the original computer and its hard drive will remain in tact, but the user desires to have the contents of the hard disk of the original computer copied on the hard disk of another computer.

Products exist for enabling the contents of a first or existing hard disk to be copied onto a second hard disk. Typically these products require that the contents of the hard disk-to-be-copied first be recorded in another medium, such as magnetic tape. After an "image" of the disk-to-be-copied has been recorded on the tape, the image can be reproduced onto another hard disk.

The existing products which restore images of hard disks require that the hard disk on which the image will be copied (e.g., the new or destination hard disk) be identical, or at least appear identical, to the hard disk from which the image was copied (the original or source hard disk). This is undesirable in the event that the new hard disk is larger than the original hard disk. Since the new hard disk must be made to look like the original hard disk, e.g., via setting BIOS settings and the like, the additional capacity of the new hard drive is wasted. Likely the new hard disk will be larger than the old hard disk, since when a user goes to buy a new hard drive, a larger hard disk will be either desired or possibly the only option available.

What is needed therefore, and an object of this invention, is a way for replicating the image of an old hard disk onto a larger new hard disk which allows substantially the entire new hard disk to be usable.

SUMMARY

Method, apparatus and program are provided for replicating an image of a source hard disk onto a larger destination hard disk in a manner that renders available the non-image-utilized sectors of the destination hard disk. Destination disk address dimensions are obtained from a drive which handles the destination hard disk. Both source disk address dimensions and an image of sectors stored on the source disk are obtained from a temporary storage media. The image of the source disk is recorded on the destination disk, but address values stored in the sectors of the image are adjusted or translated to be based on the destination disk address dimensions rather than the source disk address dimensions.

A copy routine requires a processor to obtain source disk address dimensions from a drive which handles the source hard disk, and to record sectors of the source hard disk as an "image" on the temporary storage media, along with the source disk address dimensions.

In a restore routine, the processor obtains destination disk address dimensions from a drive which handles the destination hard disk. The temporary storage media is read to obtain therefrom both the source disk address dimensions and the image of the source hard disk. For sectors in the retrieved image which have address values, e.g., address values in address fields of partition sectors, the address values are converted or translated to be based on the destination disk address dimensions rather than the source disk address dimensions. The image of the source disk, with address values converted to the destination disk address dimensions, is then stored on the destination hard disk. The conversion of the address values to the destination disk address dimensions allows sectors of the destination disk which do not store the image to be available for other (non-image) information. The temporary storage medium is preferably magnetic tape.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 1A is a schematic view of a computer configured in accordance with an embodiment of the invention to store an image of a source hard disk on a temporary storage medium.

FIG. 9 is a schematic view showing the format of an entry in a partition sector according to an embodiment of the invention.

FIG. 10 is a schematic view showing the format of a boot sector according to an embodiment of the invention.

FIG. 15 is a schematic view of a data structure according to an embodiment of the present invention.

DETAILED DESCRIPTION OF THE DRAWINGS

Figure 1B:
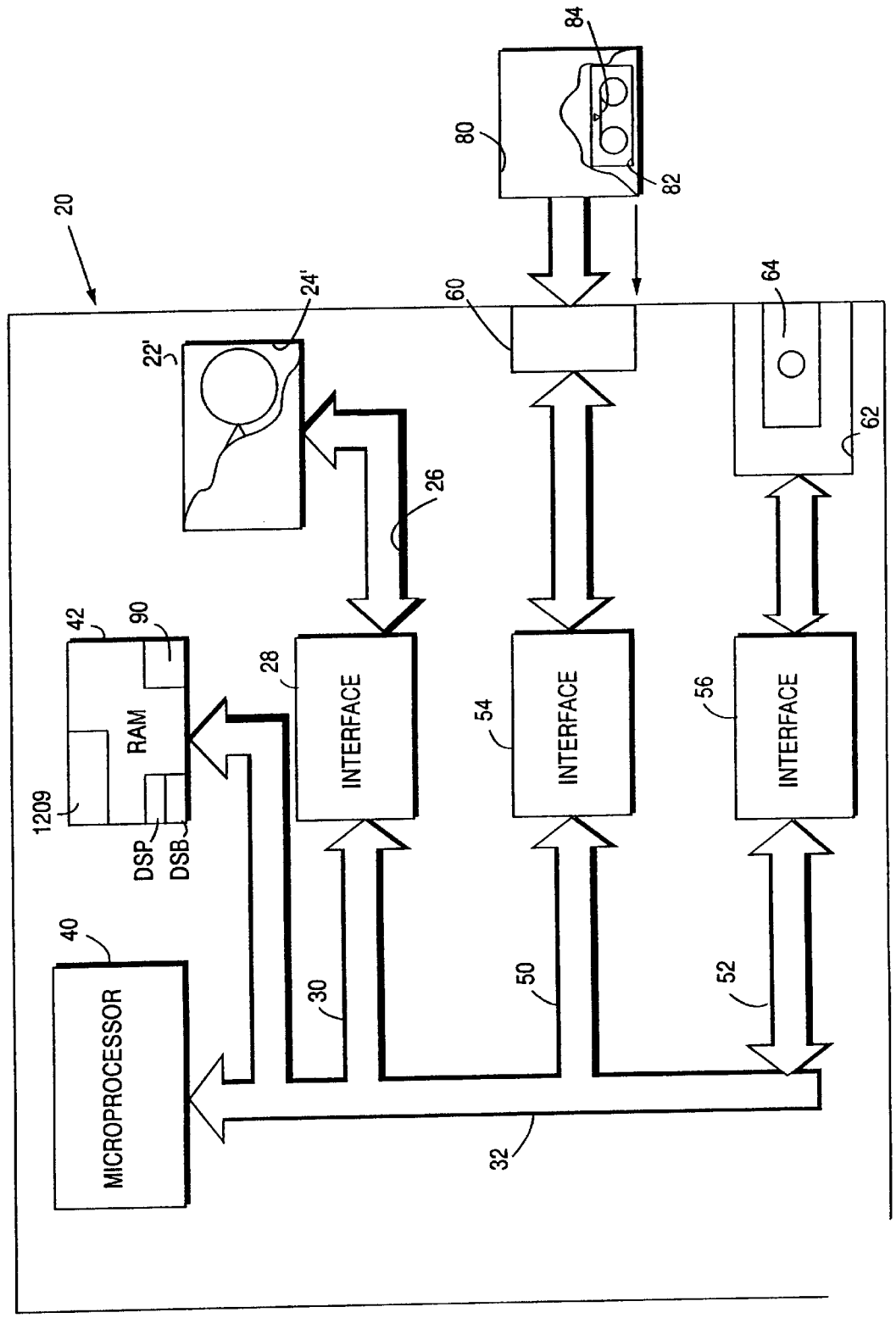
FIG. 1B is a schematic view of a computer configured in accordance with an embodiment of the invention for transferring an image of a source hard disk stored on a temporary storage medium to a destination hard disk.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

FIG. 1A shows a computer system 20 wherein a source or original hard disk 22 resides in disk drive 24. Disk drive 24 is connected by a bus 26 (e.g., an ATA bus) to a first port of an interface 28 (e.g., an ATA host adapter). A second port of interface 28 is connected to bus 30 (e.g., a PCI bus), which in turn is connected to microprocessor bus 32. Microprocessor bus 32 connects microprocessor with 40 e.g., random access memory (RAM) 42 and to buses 50 and 52. Buses 50 and 52 are connected to interfaces 54 and 56, respectively. Interface 54 is connected to an input/output port 60 of computer 20; interface 56 is connected to a floppy disk drive 62 wherein floppy disk 64 is insertable.

FIG. 1A shows a peripheral, such as magnetic tape drive 80, for example, connected to computer port 60. Tape drive 80 has a cartridge 82 inserted therein, which contains tape media 84. As used herein, tape media 84 is one example of a temporary storage media.

It should be understood that other elements, not particularly pertinent to the present invention, can be included in computer 20. Examples of these other elements include a read only memory (ROM), an interface to a user input device such as a keyboard, and a display driver (e.g., for driving a monitor or screen display, for example).

Microprocessor 40 executes coded instructions in order to perform operations required by its operating system program, including coded instructions provided as part of application programs executed in the context of the operating system. The operating system program and applications programs are typically stored on hard disk 22, but when execution by microprocessor 40 is required these programs are loaded from hard disk 22 into RAM 42 for immediate access by microprocessor 40.

Particularly pertinent to the present invention is an applications program entitled "HARD DISK RESTORE". Initially the program is stored on a floppy disk 64. When executed, the program is loaded into RAM 42, and accordingly is particularly shown in FIG. 1A as residing in RAM locations 90, for example. The steps involved in program HARD DISK RESTORE hereinafter will be referred to as being executed by processor 40.

Program HARD DISK RESTORE has two modes—a copy mode and a restore mode. In the copy mode, program HARD DISK RESTORE supervises the copying of the contents of source hard disk 22 to the temporary storage media (e.g., tape 84). In the restore mode, program HARD DISK RESTORE uses the information stored on the temporary storage media to replicate the contents of the source hard disk on a new hard disk, also known as the destination hard disk. The replication is performed in a manner, explained hereinafter, that permits portions of the destination hard disk not required for the replication to remain available for other uses.

Figure 2:
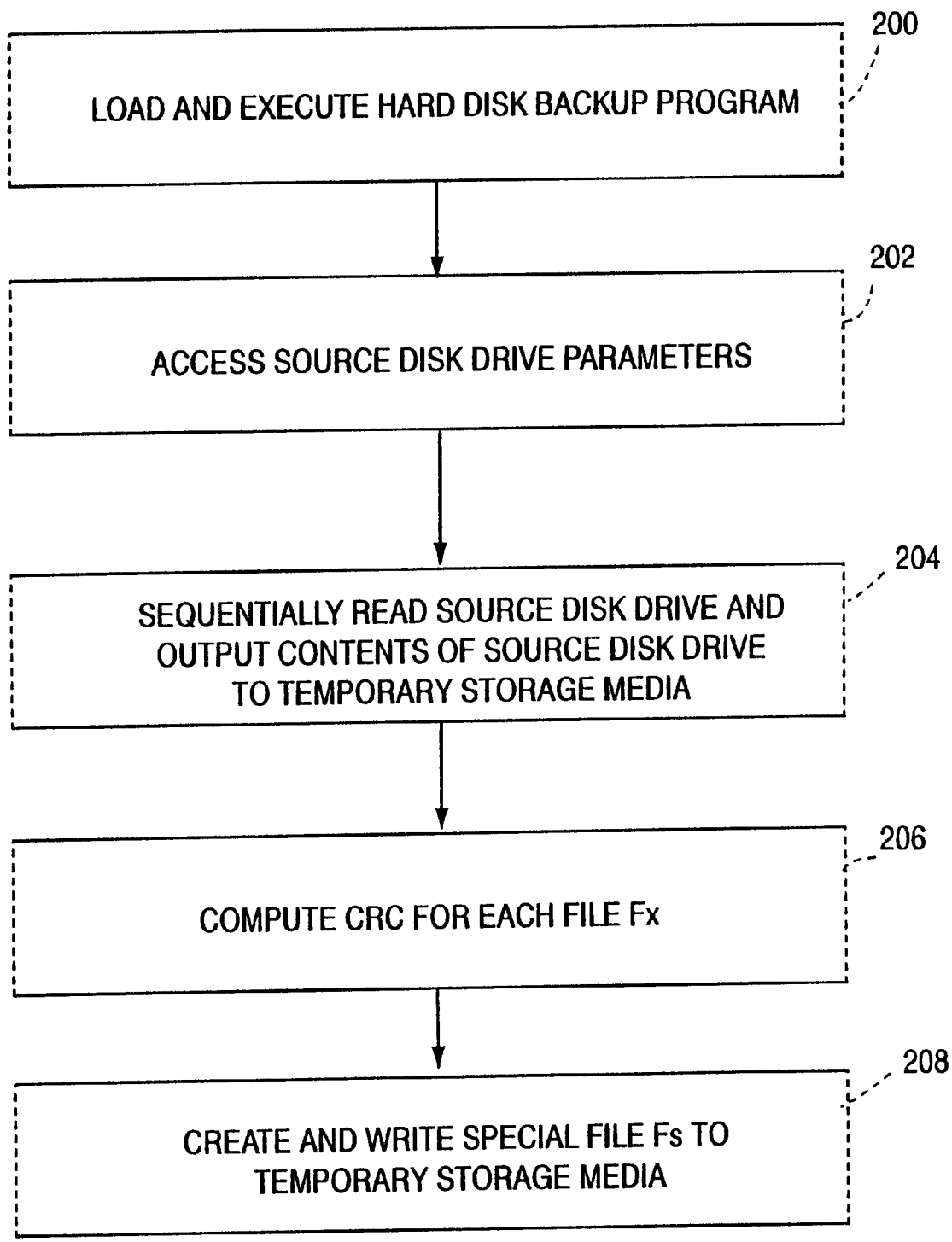
FIG. 2 is a flowchart showing basic steps performed in a mode of coping the contents of a source hard disk to a temporary storage medium.

Basic steps performed in the copy mode are shown in FIG. 2. It is first assumed that the floppy disk 64 on which program HARD DISK RESTORE is stored has been inserted in floppy drive 62, and that program HARD DISK RESTORE has been loaded into RAM memory locations 90 and has begun to execute (step 200). When a user indicates (e.g., in response to a menu display, for example) that the copy mode of the program HARD DISK RESTORE is to be executed, the remaining steps of FIG. 2 are preformed by processor 40.

At step 202, processor 40 accesses the disk drive parameters for source hard disk 22. The disk drive parameters include information such as the hard disk number (since there may be as many as two interfaces 28, and each interface may be connected to as many as two hard drives, resulting in a total of four possible hard disks), the number of cylinders in the disk drive, the number of heads in the disk drive, and the number of sectors per track on source hard disk 22. Those skilled in the art will understand how the disk drive parameters are obtained. For example, at step 202 processor 40 can query drive 24 by sending a DOS assembly language type of call known as "get drive parameters (int 13h, function 8h)."

Figure 3A:
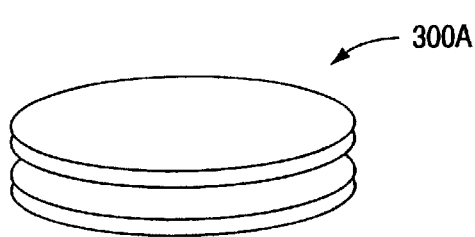
FIG. 3A and FIG. 3B are side views of hard disks having differing numbers of heads (sides).
Figure 3B:
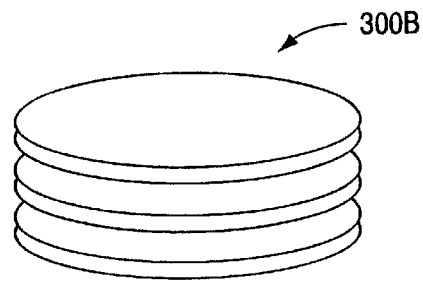
Figure 4A:
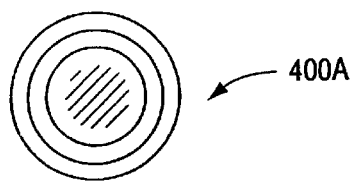
FIG. 4A and FIG. 4B are top views of hard disks having differing numbers of tracks per side.
Figure 4B:
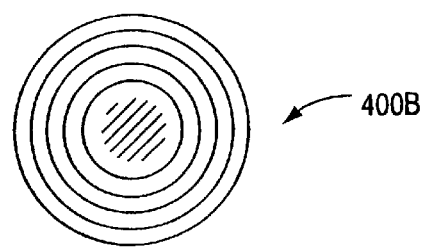
Figure 5A:
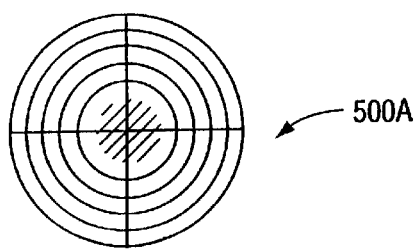
FIG. 5A and FIG. 5B are top views of hard disks having differing numbers of sectors per track.
Figure 5B:
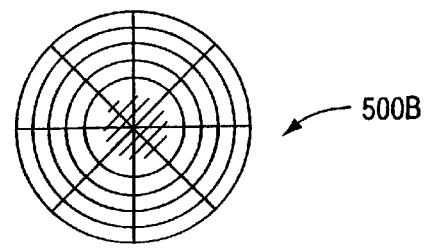

In discussing the information retrieved by querying the drive parameters at step 202, it is helpful to review concepts of hard drive dimensions. FIG. 3A shows a disk 300A with four heads, e.g., four sides or platters; FIG. 3B shows a disk 300B with six heads or platters, e.g., six sides. Each head can have a plurality of cylinders, with one cylinder positioned to read/write on a corresponding one of a plurality of concentric tracks. FIG. 4A shows a disk 400A with three tracks per side; FIG. 4B shows a disk 400B with five tracks per side. Each track is divided into a plurality of sectors. FIG. 5A shows a disk 500A with four sectors per track; FIG. 5B shows a disk 500B with eight sectors per track. Each sector contains 512 bytes of information.

Figure 6A:
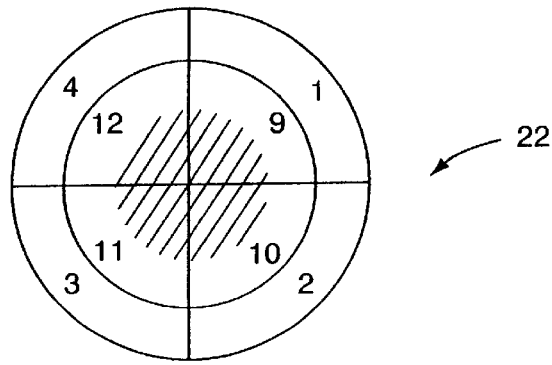
FIG. 6A and FIG. 6B are top and bottom views, respectively, of an exemplary source hard disk.
Figure 6B:
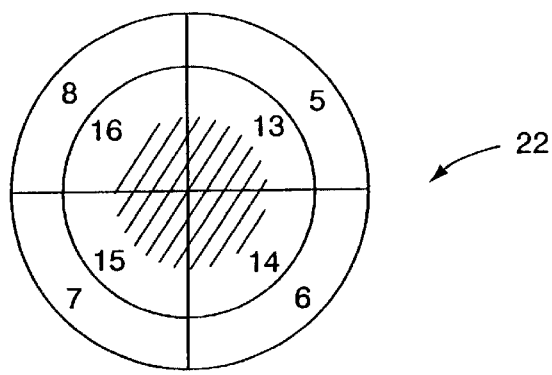

FIG. 6A and FIG. 6B show opposite sides or platters of an exemplary hard disk 22 having contents which are to be copied. FIG. 6A shows that logical sectors 1–4 are stored on the outer track of the first platter of hard disk 22 while logical sectors 9–12 are stored on the inner track of the first platter of hard disk 22. FIG. 6B shows that logical sectors 5–8 are stored on the outer track of the second platter of hard disk 22 while logical sectors 13–16 are stored on the inner track of the second platter of hard disk 22.

For hard disks, sector addresses are expressed in three dimensions, particularly the dimension of cylinders, heads, and sectors per track, sometimes referred to as "c/h/s" nomenclature. By convention, the numbering of cylinders and heads start at zero; sectors numbers on track start with 1. Therefore, hard disk 22 depicted in FIG. 6A and FIG. 6B has dimensions of 1/1/4, there being two cylinders (0,1), two heads (0,1), and four sectors per track (4) [the underlining showing how maximum parameter values are utilized to obtain the disk dimensions]. Logical sector 7 of hard disk 22 depicted in FIG. 6A and FIG. 6B has an address in terms of the dimension of disk 22 as 0/1/3, since it is accessed by the first cylinder (i.e., is on the outer track) of the second head (i.e., head 1), and is the third sector recorded by the first cylinder of the second head.

Figures 8, 11:
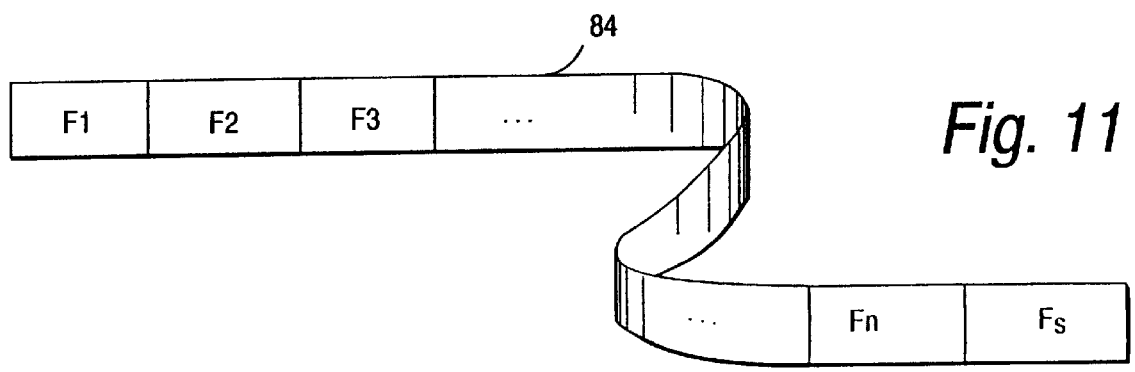
FIG. 8 is a schematic view showing the format of a partition sector according to an embodiment of the invention.
FIG. 11 is a schematic view showing the format of a temporary storage media according to an embodiment of the invention.

Hard disks, such as hard disk 22, can be divided into partitions. To facilitate such division into partitions, the first sector recorded on a hard disk is typically known as a partition sector. To the extent pertinent to the present invention, contents of a typical partition sector 800 are shown in FIG. 8. In essence, partition sector 800 is a partition table having four entries 801–804 (which serve as pointers) and a sector type identifier field 805. In the illustrated embodiment, entries 801–804 have predetermined locations corresponding to the following offsets: 0x1BE, 0x1CE, 0x1DE, 0x1EE. The sector type identifier (ID) is stored in field 805. Field 805 is located at a predetermined address in the sector, e.g., address 1FE (hexadecimal). For a partition sector, the sector type identifier has the value AA55 hexadecimal.

As shown in FIG. 9, an entry of a partition sector 800 can have stored therein the address information pertaining to other sectors. For example, field 901 of an entry contains a value indicative of the read/write head with which the partition begins, field 902 contains a value indicative of the sector and cylinder with which the partition begins, field 903 contains a value indicative of the read/write head with which the partition ends, field 904 contains a value indicative of the sector and cylinder with which the partition ends. The values are expressed in terms of the c/h/s format numbering scheme described above. Another field of an entry in the partition table which is pertinent to this invention is field 905. The first sector of a partition is known as a boot sector. Field 905 indicates how many sectors on the disk separate the boot sector of a partition from the beginning of the disk.

Slots 801–804 can have the address of another partition sector, known as an extended partition sector. In such case, another one of slots 801–804 has an address of a boot sector. Alternatively, the slots 801–804 of a partition sector can point to as many as four respective boot sectors. In the illustrated embodiment, a hard disk can have as many as twenty six partition sectors, but no more than a total of fifty two partition sectors and boot sectors.

The format of a boot sector 1000 is shown in FIG. 10. For future reference, it is noted that boot sector 1000 has two fields 1001 and 1002 which also contain address information in the c/h/s format. The fields 1001 and 1002 are words corresponding to the number of sectors per track for the sector and the number of read/write heads for the sector, and are at addresses 18H and 1AH, respectively.

After processor 40 has accessed the parameters for source hard disk 22, as shown by step 204 hard disk 22 is sequentially read and outputted to tape drive 80 in a series of files, each file constituting 10 Megabytes. The contents of tape media 84 is shown in FIG. 11. Thus, (assuming a sufficient number of sectors as occurs in the usual case) a first group of 512 byte sectors from hard disk 22 is read and outputted, one sector at a time, to fill a first file F1 on tape media 84; a second group of sectors is read and outputted to file F2, and so forth continuing to file Fn. Arrow 203 in FIG. 1A depicts the recording of sectors in file format on tape 84.

As each sector is being read and assembled into one of the files for recording on tape 84, processor 40 computes a 32 bit cyclical redundancy check (CRC) for each file, as indicated by step 206 of FIG. 2.

By virtue of containing files F1 through Fn, temporary storage media 84 is said to contain an "image" of the source or original hard disk 22. After all files (Fx, x=1, . . . , n) have been recorded on tape 84, processor 40 prepares and writes to tape 84 a special file Fs (see step 208). File Fs, having a format shown in Table 1, includes the parameters gleaned at step 202 regarding source disk drive 24, and the CRCs computed at step 206.

TABLE 1

| length | description |
| --- | --- |
| Format of File Fs | |
| 1 byte | format version |
| 1 byte | physical disk number |
| 4 bytes | total number of sectors recorded |
| 4 bytes | number of sectors per file |

TABLE 1-continued

Format of File Fs

| length | description |
| --- | --- |
| 4 bytes | number of bytes per sector |
| variable | CRC table |
| variable | bad sector map |
| 4 bytes | number of cylinders on source disk ($c_{source}$) |
| 4 bytes | number of heads on source disk ($h_{source}$) |
| 4 bytes | number of sectors per track on source disk ($s_{source}$) |

In the particular embodiment herein illustrated, the number of sectors per file is 19531 and the number of bytes per sector is 512.

Figure 7A:
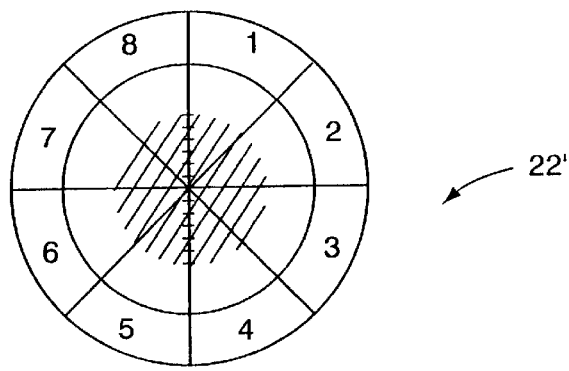
FIG. 7A and FIG. 7B are top and bottom views, respectively, of an exemplary destination hard disk.
Figure 7B:
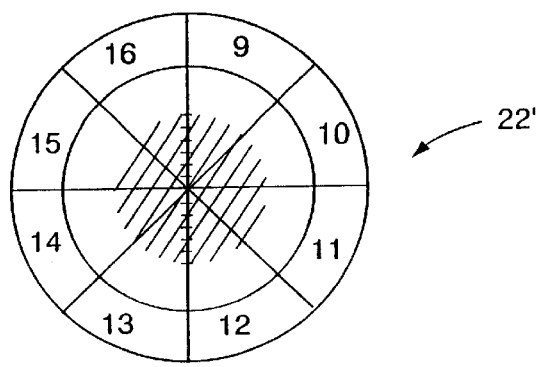

FIG. 1B shows that a new hard drive 24' with a new hard disk 22' is installed in computer 20. Installation of a new hard disk 22' may occur, for example, if a user wants to upgrade computer 20 or if the original hard disk 22 has an irreparable error or problem. For the present example, it is assumed that new hard disk 22' installed in FIG. 1B is configured as shown in FIG. 7A and FIG. 7B. Whereas the original hard disk 22 had two cylinders, two heads, and four sectors per track, new hard disk 22' has two cylinders, two heads, and eight sectors per track. New hard disk 22' is thus larger than old hard disk 22, having a greater number of sectors per track (all sectors still having the 512 byte capacity).

Prior art techniques involve transferring of sectors from the old hard disk 22 to the new hard disk 22' in such a manner that the addressing of the sectors recorded on new hard disk 22' is the same as on old hard disk 22. That is, in accordance with the prior art techniques and with reference to FIG. 6A and FIG. 7A, for example, logical sectors 1–4 would be stored in the first four sectors of the outer track of the first platter of the new hard disk while logical sectors 9–12 would be stored in the first four sectors of the inner track of the first platter of the new hard disk, and similarly for the second platter. The result of using the same addressing scheme for the new hard disk would render remaining sectors of the new hard disk unusable, and thus the advantage of the larger size of the new hard disk is negated. The present invention overcomes this wasteful practice, as is understood by the ensuing discussion of the restore mode of the program HARD DISK RESTORE.

Figure 12:
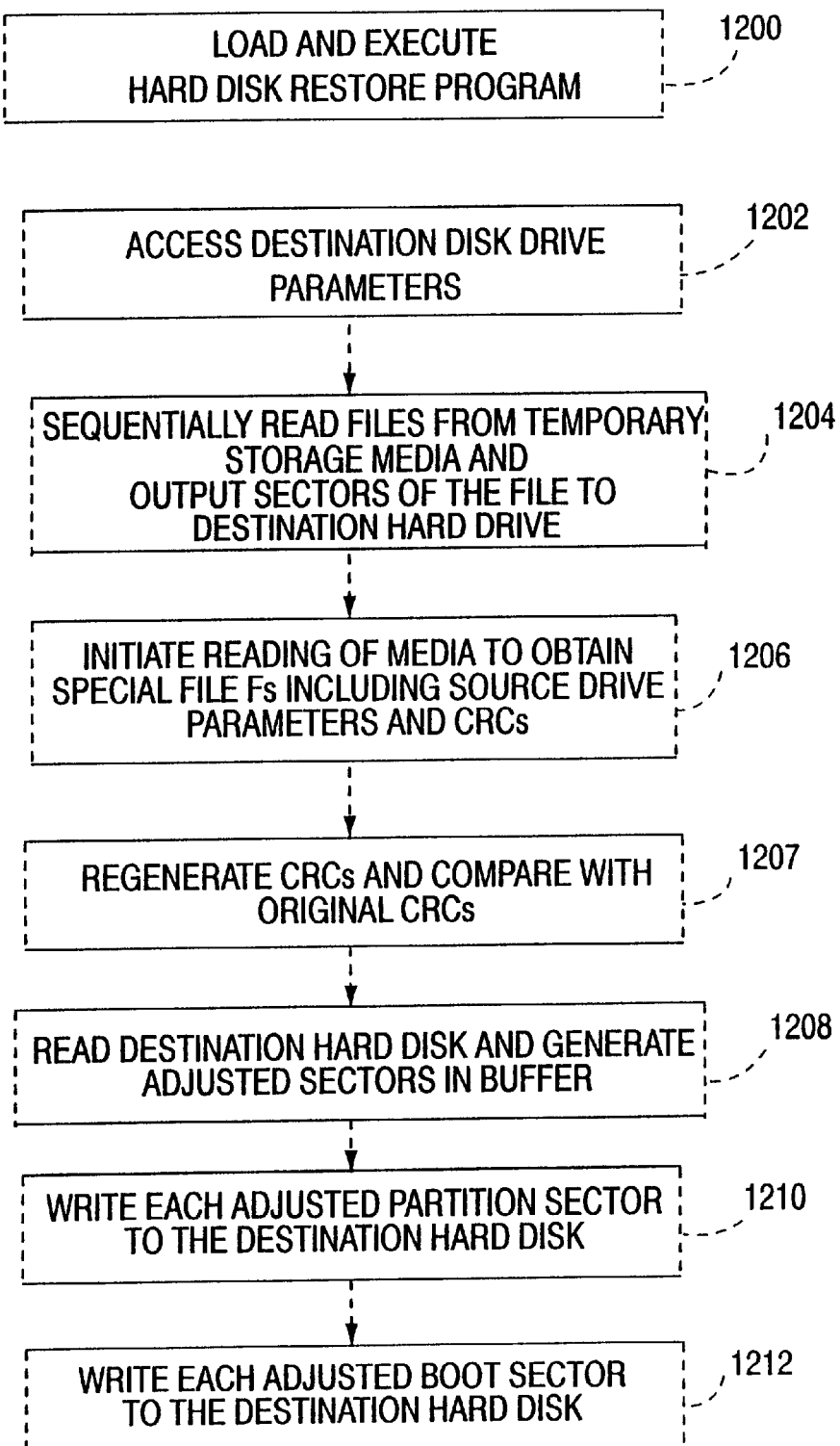
FIG. 12 is a flowchart showing basic steps performed in a mode of restoring the image of a source hard disk from a temporary storage medium to a destination hard disk.

Basic steps involved in the restore mode of the program HARD DISK RESTORE are illustrated in FIG. 12. In the restore mode, the new hard disk 22' is also referred to as the destination hard disk. It is assumed, as depicted by step 1200, that the floppy disk 64 on which program HARD DISK RESTORE is stored has been inserted in floppy drive 62, and that program HARD DISK RESTORE has been loaded into RAM memory locations 90 and has begun to execute. When a user indicates (e.g., in response to a menu display, for example) that the restore mode of the program HARD DISK RESTORE is to be executed, the remaining steps of FIG. 12 are perform by processor 40.

At step 1202, processor 40 accesses the disk drive parameters for destination hard disk 22'. As mentioned above, the disk drive parameters include information such as the number of cylinders in the new disk drive 24', the number of heads in the new disk drive 24', and the number of sectors per track on destination hard disk 22'. Henceforth, these parameters are known as $c_{destination}$, $h_{destination}$, and $s_{destination}$. Step 1202 is thus similar to step 202, but pertains to the destination hard disk 22' rather than the source hard disk 22.

At step 1204, processor initiates reading of media 84 in order to obtain the files F1–Fn recorded thereon. As each file Fx is retrieved from media 84, the sectors constituting those files are recorded one at a time on destination hard disk 22'. The sectors are recorded in sequential order on destination hard disk 22', e.g., the first sector of the first file is recorded in the first physical sector of disk 22'; the second sector of the first file is recorded in the second physical sector of disk 22', and so forth. Thus, the recording of the sectors on disk 22' is not constrained by the manner in which the sectors were addressed on source disk 22.

After all files F1–Fn have been obtained from temporary storage media 84, special file Fs (recorded after file Fn) is obtained at step 1206. As indicated previously, file Fs includes parameters gleaned at step 202 regarding source disk drive 24, and the CRCs computed at step 206. Thus, processor 40 obtains e.g., the disk drive parameters for the source (old) hard disk 22 (e.g., the number of cylinders in the old disk drive 24, the number of heads in the old disk drive, and the number of sectors per track on source hard disk 22). Henceforth, these parameters are known as $c_{source}$, $h_{source}$, and $s_{source}$.

At step 1207, sectors of destination disk 22' are read 10 Megabyte at a time, and CRC values computed (e.g., regenerated) over the 10 Megabytes as read from disk 22'. The regenerated CRC values for the 10 Megabytes read from disk 22' is compared with the CRCs stored in file Fs for the file Fx which supposedly corresponds to the same 10 Megabytes of sector data. If the regenerated and original CRC values are not identical, an error has occurred.

At step 1208, for partition sectors (including extended partition sectors) and boot sectors recorded at step 1204 on destination hard disk 22', processor 40 generates adjusted sectors. The adjusted sectors are stored in adjusted sector buffer locations 1209 of RAM 42. In view of factors previously mentioned, buffer location 1209 of RAM 42 may contain as many as fifty two sectors. The adjusted sectors are ultimately recorded on destination hard disk 22' to replace corresponding unadjusted sectors as obtained from storage media 84.

Figure 13:
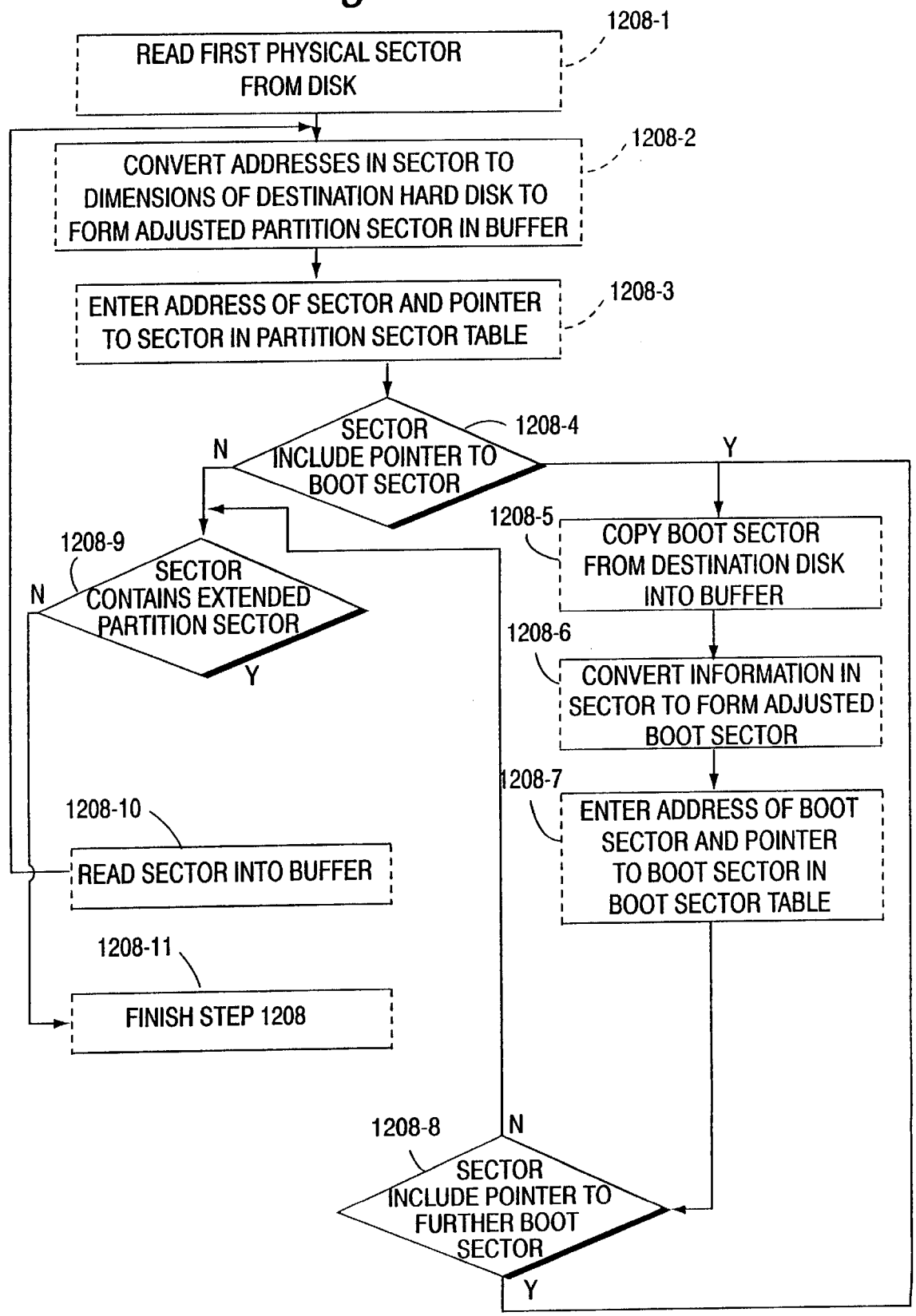
FIG. 13 is a flowchart showing basic steps performed in generating adjusted sectors in a buffer.

FIG. 13 shows substeps involved in the generation of adjusted sectors. At substep 1208-1, the first physical sector on destination hard disk 22', known to be a partition sector, is read and stored into a first of the adjusted sector buffer locations 1209. Then, at substep 1208-2, addresses in the partition sector are converted to be based on address dimensions of destination disk 22' rather than source disk 22.

At substep 1208-2, each field in the partition sector which contains address information is accessed. In particular, for each of as many as four entries shown in FIG. 9, fields 901–904 may require conversion. Field 901 and 902 include components of an address for a sector at which a partition begins; fields 903 and 904 include components of an address for a sector at which a partition ends. Fields 901 and 903 are eight bit (1 byte) head numbers; fields 902 and 904 are each two bytes: a first byte has a six bit sector number and the high two bits of the cylinder number and a second byte is the lower order eight bits of the cylinder number. Field 905 indicates how many sectors on the disk separate the boot sector of a partition from the beginning of the disk.

In essence, for each entry in the partition sector, at substep 1208-2 the address of the sector which begins a partition (found in fields 901 and 902) is decoded from source disk address dimensions; an original logical sector number (e.g., sector count from the start of the disk determined); and, the address is converted to destination disk address dimensions. Similarly, for each entry in the partition table, the same operations are undertaken for the address of the sector which ends a partition (found in fields 903 and 904).

Although presently FIG. 13 is being described in the context of the first sector on destination disk 22', it is more instructive to provide an example of address conversion for another sector, such as the seventh logical sector. Whereas the seventh logical sector had the address of 0/1/3 (c/h/s format) in source disk address dimensions (see FIG. 6A and the prior discussion pertaining thereto), substep 1208-2 involves converting this address to destination disk address dimensions.

Figure 14:
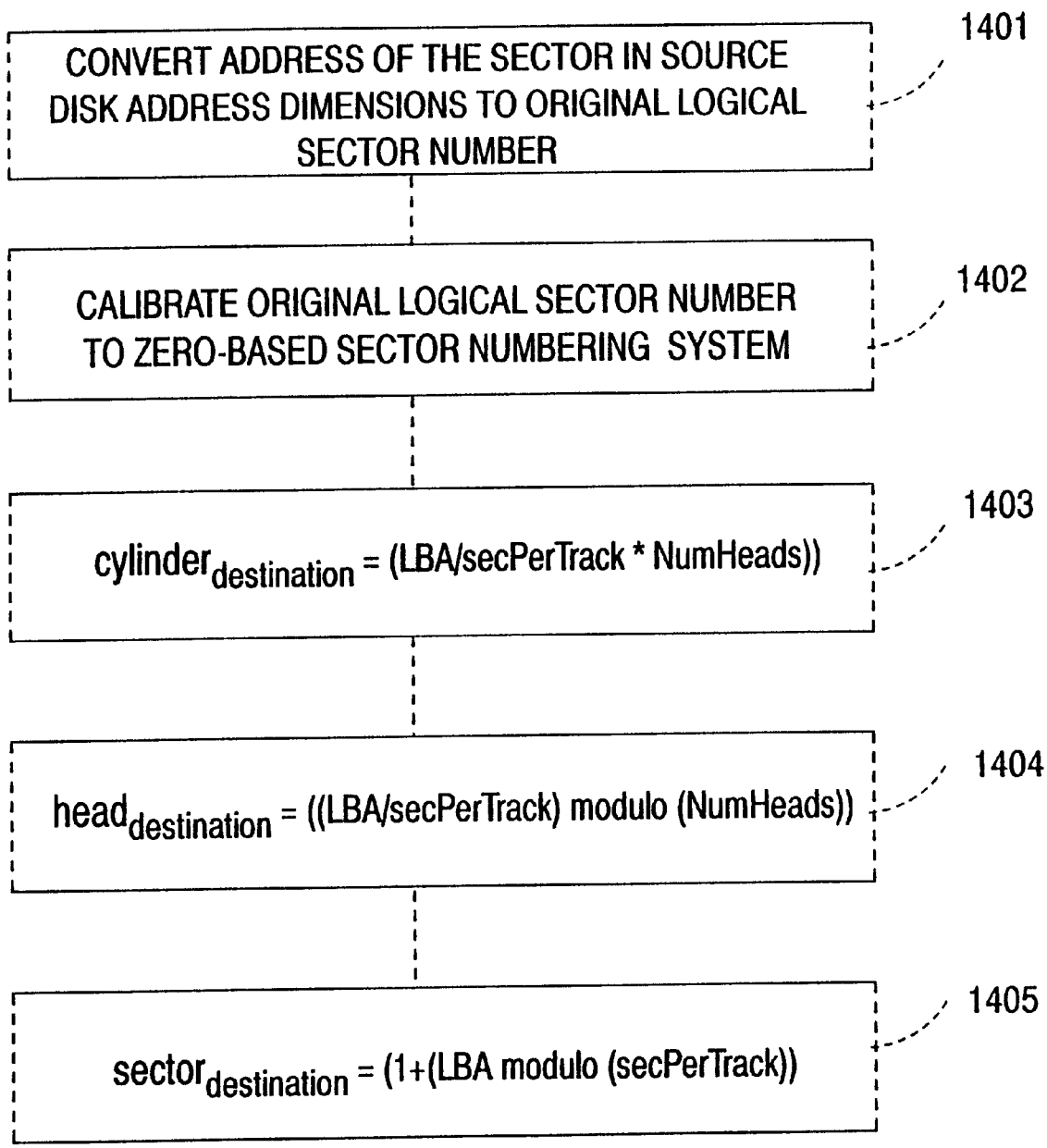
FIG. 14 is a flowchart showing basic steps involved in converting a sector address to be based on destination disk address dimensions.

In the conversion process, the steps of which are shown in FIG. 14, the address of the sector in source disk address dimensions is first converted to the original logical sector number (conversion step 1401). Such conversion is performed by the following equation 1:

EQUATION 1:

$$logicalSector = ((cylinder * numHeads + head) * secPerTrack) + sector$$

Thus, for a sector having a field containing an address 0/1/3, the value of logicalSector is computed as follows:

logicalSector=((0*+0)*4)+7 logicalsector=7 it being noted as previously explained that cylinder and head numbers start with 0. It will be recalled that the sectors per track information for source disk 22 was previously obtained at step 202 and recorded in file Fs.

Since the destination disk address dimensions are known, having been obtained as parameters $c_{destination}$, $h_{destination}$, and $s_{destination}$ at step 1202, the original logical sector number can be used to determine a converted destination disk address dimension-based sector address.

At step 1402 the original logical sector number is calibrated to a sector numbering system which begins with zero by subtracting one from the value computed at step 1401. Thus, LBA, the original logical sector number in terms of a 0-based sector number, is LBA=7−1=6. The value calculated at step 1402 is stored in field 905 of the entry in the partition table (see FIG. 9).

At step 1403, the cylinder number of the sector expressed in terms of the destination disk address dimensions, $cylinder_{destination}$, is calculated by Equation 2:

Equation 2:

$$cylinder_{destination} = (LBA/secPerTrack * NumHeads))$$

The number of sectors per track (secPerTrack), and the number of heads (NumHeads) for destination disk 22' was previously determined at step 1202 (see FIG. 12). Thus, for logical sector having LBA=6, the value of $cylinder_{destination}$ is computed as (6/(8*1))=0.

At step 1404, the head number of the sector expressed in terms of the destination disk address dimensions, $head_{destination}$, is calculated by Equation 3:

Equation 3:

$$head_{destination} = ((LBA/secPerTrack) modulo (NumHeads))$$

For the logical sector having LBA=6, the value of $head_{destination}$ is computed as (6/8) modulo(1)=0 modulo(1)=0.

At step 1405, the sector number of the sector expressed in terms of the destination disk address dimensions, $sector_{destination}$, is calculated by Equation 4:

Equation 4:

$$sector_{destination} = (1 + (LBA modulo (secPerTrack))$$

For the logical sector having LBA=6, the value of $sector_{destination}$ is computed as (1+(6 modulo(8))=1+6=7.

FIG. 14, as described above, thus shows how a sector address is converted to address dimension of the destination hard disk 22', as required by substep 1208-2 of FIG. 13.

Records are kept regarding partition sectors and boot sectors. In particular, there are in RAM 42 both a data structure DSP for partition sectors and a data structure DSB for boot sectors. FIG. 15 represents the contents of each data structure DSP, DSB. Each data structure DSP, DSB has as many as twenty six records, each record being shown as records 1500(1) . . . 1500(26). Each record 1500 has two portions. A first portion 1500A is the address of the sector (e.g., partition sector for data structure DSP; boot sector for data structure DSB), which is similar to fields 901 and 902, for example, of FIG. 9. A second portion 1500B is a pointer to an address in adjusted sector buffer locations 1209 whereat the corresponding adjusted sector is stored.

After addresses in a partition sector have been converted to form an adjusted partition sector, at substep 1208-3 an entry is made in data structure DSP for the sector. In this regard, the address of the partition sector is loaded into portion 1500A of a record in data structure DSP and a pointer to the location of the partition sector in buffer locations 1209 is stored in portion 1500B of the same record. For the first partition sector on a disk, i.e., the first sector on the disk, the address in c/h/s format is known and does not need to be computed. When sub-step 1208-3 is executed for extended partition sectors, the address of the extended partition in c/h/s will have been calculated by a previous execution of substep 1208-2.

Thus, the first partition sector is assigned the first record in data structure DSP, any second, third, and fourth, etc., partition sectors (e.g., extended partition sectors) are assigned the second, third, and fourth, etc., records in data structure DSP.

At substep 1208-4 a check is made to determine whether the first entry in the partition sector includes a pointer to a boot sector. Such a check is made by determining whether any of bits 1, 4, or 6 in field 906 of a partition sector table entry (see FIG. 9) is set. If it is determined that the table entry pertains to a boot sector, substeps 1208-5 through 1208-8 are executed for the entry.

At substep 1208-5, the boot sector is located on destination disk 22' and its contents copied into the next available location in buffer locations 1209. Since the address of the boot sector based on destination disk address dimensions was computed at substep 1208-2, access to and reading of the boot sector is easily performed.

At substep 1208-6, disk information contained in the boot sector itself is modified. In particular, as shown in FIG. 10, fields 1001 and 1002 require modification to reflect the number of sectors per track and the number of read/write heads, respectively, of destination disk 22' (replacing values for source disk 22). The information utilized for the replacement was previously obtained at step 1202 (see FIG. 12).

At substep 1208-7, the data structure DSB is updated to include the boot sector being processed. In this regard, the address of the boot sector (having been converted at substep 1208-3) is loaded into portion 1500A of the next available record in data structure DSB; a pointer to the boot sector's location in buffer locations 1209 is loaded into portion 1500B of the same record.

Substep 1208-8 involves determining whether the partition sector has pointers to other boot sectors (pointers to as many as four boot sectors being includable in a partition sector). If the partition does have further boot sector pointers, execution returns to substep 1208-5 for execution of substeps 1208-5 through 1208-8. Thus, the loop comprising substeps 1208-5 through 1208-8 can be executed as many as four times per partition sector.

After all boot sectors pointed to by a particular partition sector have been processed as described above, or if a partition sector does not have a pointer to a boot sector, substep 1208-9 is executed. At substep 1208-9, a determination is made whether the partition sector contains a pointer to an extended partition sector. A pointer to an extended partition sector has bit 5 set in field 906 of a partition sector table entry (see FIG. 9).

If there are no extended partition sectors pointed to by the partition sector, step 1208 is terminated as indicated by substep 1208-11. If an extended partition sector is detected, however, it is located and read into the next available one of the buffer locations 1209. Location of the extended partition sector is possible in view of the fact that its address was previously converted at substep 1208-2. Then, execution returns to substep 1208-2 so that address conversion can be performed with respect to the extended partition sector, with an adjusted partition sector being stored after conversion into the corresponding position in buffer locations 1209.

Thus, substeps 1208-2 through 1208-4 and 1208-9 through 1208-10 are performed for each partition sector, including the first partition sector and any remaining partition sectors (i.e., extended partition sectors). For any boot sectors, substeps 1208-5 through 1208-8 are optionally performed.

Returning to FIG. 12, after all partition sectors and boot sectors requiring adjustment have been adjusted, step 1210 is executed. At step 1210, data structure DSP is searched to find the location of all partition sectors (i.e., the first partition sector and subsequent extended partition sectors). For each record in data structure DSP, the address of the sector is gleaned from record first portion 1500A (see FIG. 15) and a pointer to the address of the adjusted sector is obtained from the record second portion 1500B. Processor 40 can then cause the recording of the adjusted sector (stored in locations 1209 at the address pointed to by record second portion 1500B) at the disk address specified in record first portion 1500A. The recording of adjusted sectors continues in this manner for each partition sector.

In a similar manner as with partition sectors, at step 1212, data structure DSB is searched to find the location of all boot sectors. Processor 40 can similarly cause the recording of the adjusted boot sectors (stored in locations 1209 at the address pointed to by record second portion 1500B) at the disk address specified in record first portion 1500A. The recording of adjusted boot sectors continues in this manner for each boot sector listed in data structure DSB.

Thus, the present invention allows an image of a source hard drive to be replicated on a larger destination hard drive. Upon implementation of the present invention, execution by processor 40 of programs entitled FDISK and FORMAT permits a user to have access to portions of the destination hard drive which were not utilized for replication of the image of the source drive.

It should be understood that the principles of the present invention apply with equal force to copying the image of a source hard disk in a first computer to a destination hard disk in a second computer. That is, the destination hard drive need not necessarily be a replacement or upgrade of the source hard disk and used in the same computer. Moreover, the techniques of the present invention are not limited to magnetic hard disks, but apply as well to optical hard disks having comparable dimensioning schemes.

Although the temporary storage media has been illustrated in the exemplary embodiments as magnetic tape, it should be understood that the storage media is not so confined and that other media, e.g., another hard disk or optical disk, can instead be employed. Moreover, concerning the embodiments wherein a tape drive is utilized, the tape drive can be an external tape drive such as shown in the drawings hereof or an internal tape drives such as the Eagle™ family of tape drives manufactured by Exabyte Corporation.

While the invention has been particularly shown and described with reference to the preferred embodiments thereof, it will be understood by those skilled in the art that various alterations in form and detail may be made therein without departing from the spirit and scope of the invention.

I claim:

1. A method of replicating the contents of a first hard disk having first hard disk dimension parameters onto a second hard disk having second hard disk dimensioning parameters; the first hard disk dimensioning parameters including a number of cylinders in a disk drive for the first hard disk, a number of heads in the disk drive for the first hard disk, and a number of sectors per track on the first hard disk; the second hard disk dimensioning parameters including a number of cylinders in a disk drive for the second hard disk, a number of heads in the disk drive for the second hard disk, and a number of sectors per track on the second hard disk; at least one of the second hard disk dimensioning parameters being different from the first hard disk dimensioning parameters; the method comprising:

retrieving sectors of the first hard disk from a temporary storage medium;

obtaining address fields stored in sectors retrieved from the temporary storage medium and translating address values based on first hard disk dimensioning parameters in the address fields to address values based on second hard disk dimensioning parameters;

recording the sectors retrieved from the temporary storage medium on the second hard disk, with sectors having address fields therein being stored as adjusted sectors on the second hard disk, the address values in the address fields in the adjusted sectors being based on second hard disk dimensioning parameters.

2. The method of claim 1, wherein the address fields are stored in partition sectors.

3. The method of claim 2, wherein the address fields in partition sectors are address values for one of an extended partition sector and a boot sector.

4. The method of claim 1, wherein the address fields are stored in boot sectors.

5. The method of claim 1, further comprising retrieving from the temporary storage medium information pertaining to the first hard disk dimensioning parameters;

using the first hard disk dimensioning parameters to determine an original logical sector number;

using the original logical sector number to determine the address values in the address fields in the adjusted sectors.

6. The method of claim 1, further comprising obtaining the second hard disk dimensioning parameters from a drive which handles the second hard disk.

7. The method of claim 1, wherein the temporary storage medium is a magnetic tape.

8. An executable program stored in a electromagnetic memory and executable by a processor for replicating the contents of a first hard disk having first hard disk dimension parameters onto a second hard disk having second hard disk dimensioning parameters; the first hard disk dimensioning parameters including a number of cylinders in a disk drive for the first hard disk, a number of heads in the disk drive for the first hard disk, and a number of sectors per track on the first hard disk; the second hard disk dimensioning parameters including a number of cylinders in a disk drive for the second hard disk, a number of heads in the disk drive for the second hard disk, and a number of sectors per track on the second hard disk; at least one of the second hard disk dimensioning parameters being different from the first hard disk dimensioning parameters; the program including a set of instructions comprising:

instructions for causing the processor to obtain second hard disk dimensioning parameters from a drive which handles the second hard disk;

instructions for reading a temporary storage media and obtaining therefrom both first hard disk dimensioning parameters of the first hard disk and an image of sectors of the first hard disk; and instructions for recording the image on the second hard disk but with address values stored in the sectors of the image adjusted to be based on the second hard disk dimensioning parameters rather than the first hard disk dimensioning parameters.

9. The program of claim 8, wherein the set of instructions further comprises a copy routine which requires the processor to obtain first hard disk dimensioning parameters from a drive which handles the first hard disk and to record sectors of the first hard disk and the first hard disk dimensioning parameters on a temporary storage media.

10. The program of claim 8, wherein the address fields are stored in partition sectors.

11. The program of claim 10, wherein the address fields in partition sectors are address values for one of an extended partition sector and a boot sector.

12. The program of claim 10, wherein the address fields having first hard disk dimensioning parameters are stored in boot sectors.

13. The program of claim 8, further comprising instructions for retrieving from the temporary storage medium information pertaining to the first hard disk dimensioning parameters;

instructions for using the first hard disk dimensioning parameters to determine an original logical sector number;

instructions for using the original logical sector number to determine the address values in the address fields in the adjusted sectors.

14. The program of claim 8, further comprising instructions for obtaining the second hard disk dimensioning parameters from a drive which handles the second hard disk.

15. The program of claim 8, wherein the temporary storage medium is a magnetic tape.

16. A computer comprising:

a memory wherein a program including a set of instructions is stored;

a processor for executing the instructions included in the program;

a disk drive which performs input and output operations for a destination hard disk;

an interface connected to a temporary storage media; and wherein the processor replicates the contents of a source hard disk on the destination hard disk by obtaining destination hard disk dimension parameters from the drive; by reading a temporary storage media and obtaining therefrom both source hard disk dimension parameters of the source hard disk and an image of sectors of the source hard disk; and by recording the image on the destination hard disk but with address values stored in the sectors of the image adjusted to be based on the destination hard disk dimension parameters rather than the source hard disk dimension parameters; the source hard disk dimensioning parameters including a number of cylinders in a disk drive for the source hard disk, a number of heads in the disk drive for the source hard disk, and a number of sectors per track on the source hard disk; the destination hard disk dimensioning parameters including a number of cylinders in a disk drive for the destination hard disk, a number of heads in the disk drive for the destination hard disk, and a number of sectors per track on the destination hard disk; at least one of the destination hard disk dimensioning parameters being different from the source hard disk dimensioning parameters.

17. The method of claim 5, wherein the step of using the original logical sector number to determine the address values in the address fields in the adjusted sectors further comprises determining a cylinder number $\text{cylinder}_{destination}$ for the address values, the cylinder number $\text{cylinder}_{destination}$ being determined by the relationship $$\text{cylinder}_{destination}=(\text{LBA}/\text{secPerTrack}*\text{NumHeads}))$$

wherein secPerTrack is a number of sectors per track; NumHeads is a number of heads (NumHeads) for second hard disk, and LBA is the original logical sector number.

18. The method of claim 5, wherein the step of using the original logical sector number to determine the address values in the address fields in the adjusted sectors further comprises determining a head number $\text{head}_{destination}$ for the address values, the head number $\text{head}_{destination}$ being determined by the relationship $$\text{head}_{destination}=((\text{LBA}/\text{secPerTrack})\text{modulo}(\text{NumHeads}))$$

wherein secPerTrack is a number of sectors per track; NumHeads is a number of heads (NumHeads) for second hard disk, and LBA is the original logical sector number.

19. The method of claim 5, wherein the step of using the original logical sector number to determine the address values in the address fields in the adjusted sectors further comprises determining a sector number $\text{sector}_{destination}$ for the address values, the sector number $\text{sector}_{destination}$ being determined by the relationship $$\text{sector}_{destination}=(1+(\text{LBA modulo}(\text{secPerTrack}))$$

wherein secPerTrack is a number of sectors per track; and LBA is the original logical sector number.

20. The program of claim 13, wherein the instructions which use the original logical sector number to determine the address values in the address fields in the adjusted sectors further comprises determining a cylinder number $\text{cylinder}_{destination}$ for the address values, the cylinder number $\text{cylinder}_{destination}$ being determined by the relationship $$\text{cylinder}_{destination}=(\text{LBA}/\text{secPerTrack}*\text{NumHeads}))$$

wherein secPerTrack is a number of sectors per track; NumHeads is a number of heads (NumHeads) for second hard disk, and LBA is the original logical sector number.

21. The program of claim 13, wherein the instructions which use the original logical sector number to determine the address values in the address fields in the adjusted sectors further comprises determining a head number $head_{destination}$ for the address values, the head number $head_{destination}$ being determined by the relationship $$head_{destination} = ((LBA/secPerTrack) \bmod (NumHeads))$$

wherein secPerTrack is a number of sectors per track; NumHeads is a number of heads (NumHeads) for second hard disk, and LBA is the original logical sector number.

22. The program of claim 13, wherein the instructions which use original logical sector number to determine the address values in the address fields in the adjusted sectors further comprises determining a sector number $sector_{destination}$ for the address values, the sector number $sector_{destination}$ being determined by the relationship $$sector_{destination} = (1 + (LBA \bmod (secPerTrack)))$$

wherein secPerTrack is a number of sectors per track; and LBA is the original logical sector number.

* * * * *